(12) United States Patent
Hansson et al.

(10) Patent No.: US 7,246,974 B2
(45) Date of Patent: Jul. 24, 2007

(54) CUTTING TOOL HEAD FOR A METALWORKING TOOL

(75) Inventors: Per Hansson, Gävle (SE); Erik Berminge, Gävle (SE); Helena Olsson, Gavle (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/518,235

(22) PCT Filed: Jun. 16, 2003

(86) PCT No.: PCT/SE03/01013

§ 371 (c)(1),
(2), (4) Date: May 27, 2005

(87) PCT Pub. No.: WO03/106084

PCT Pub. Date: Dec. 24, 2003

(65) Prior Publication Data

US 2005/0207853 A1 Sep. 22, 2005

(30) Foreign Application Priority Data

Jun. 18, 2002 (SE) .................................. 0201861

(51) Int. Cl.
*B26D 7/26* (2006.01)
*B26D 1/00* (2006.01)
(52) U.S. Cl. ....................... 407/109; 409/107
(58) Field of Classification Search ............... 407/110, 407/109, 101, 50, 107, 108
See application file for complete search history.

(56) References Cited

U.S. PATENT DOCUMENTS

| 3,775,818 | A | | 12/1973 | Sirola |
| 4,235,564 | A | | 11/1980 | Huser |
| 4,887,945 | A | | 12/1989 | Pano |
| 5,112,164 | A | | 5/1992 | Pano |
| 5,207,537 | A | | 5/1993 | Englund |
| 5,833,403 | A | * | 11/1998 | Barazani ..................... 407/101 |
| 5,921,724 | A | * | 7/1999 | Erickson et al. ............ 407/117 |
| 6,086,291 | A | | 7/2000 | Hansson et al. |
| 6,186,704 | B1 | | 2/2001 | Hale |
| 6,270,294 | B1 | | 8/2001 | Sjöö et al. |
| 2005/0180824 | A1 | | 8/2005 | Hansson et al. |

FOREIGN PATENT DOCUMENTS

DE          10149426          4/2002

* cited by examiner

*Primary Examiner*—Willmon Fridie, Jr.
(74) *Attorney, Agent, or Firm*—Drinker Biddle & Reath LLP

(57) ABSTRACT

A tool head, which is adapted to receive a cutting insert for chip removal machining, includes a basic holder which has a lower support part and an upper clamping portion defining therebetween an insert-receiving pocket. A slot extends through the basic holder at a location spaced from the pocket, wherein the clamping portion is joined to a remaining portion of the basic holder by a hinge portion about which the clamping portion is elastically displaceable toward the cutting insert. A recess extends through the basic holder parallel to the slot and in communication therewith, the recess receiving a nut roll. A clamping screw extends through the slot and into threaded engagement with the nut roll, wherein the clamping screw includes a conical head arranged to enter the slot for expanding the slot and elastically displacing the clamping portion about the hinge and toward the cutting insert.

13 Claims, 1 Drawing Sheet

CUTTING TOOL HEAD FOR A METALWORKING TOOL

The present invention relates to a tool head for machining tool of the kind intended for chipbreaking machining of metal. The tool head comprises a basic holder and a toolholder connected therewith. More specifically this tool is intended for that type of machining referred to as parting and grooving.

STATE OF THE ART

Within the field of chip removing machining there are tool couplings of various kinds in order to achieve a torque resistant connection between various holders and adapters, though most common in turning tools of various kinds. For instance, Swedish patent application 7813038-2 (corresponding to U.S. Pat. No. 4,235,564) discloses a tool for parting and grooving wherein co-operating serrations with clamping screws are used for clamping purposes. In this case the number of screws for clamping the adapter is three. This means that the activity of first disengaging three comparatively long screws and subsequently tightening them again when insert change is needed for indexing a new cutting edge is rather time consuming. Further, Swedish patent application 9004032-0 (corresponding to U.S. Pat. No. 5,207,537) discloses a cutting tool comprising an insert-provided bolder blade in an insert pocket where the insert is clamped by arranging for a press means to engage at inclined angle towards a slot in the insert pocket such that an upper clamping arm portion of the holder blade is subjected to elastic bending and a force activated therefrom towards the upper surface of the insert. Due to the fact that the press means is constituted by a relatively long pin this system becomes relatively space consuming in a narrow holder blade for a parting tool.

OBJECT AND FEATURES OF THE INVENTION

The present invention aims at removing the shortcomings mentioned above in connection with previously known tools of the type in question and at providing an improved coupling. Thus, a primary object of the invention is to create a device by means of which the necessary cutting insert exchanges are effected in a quick and simple way without dismounting each clamp screw in its entirety. A further object is to create a tool that makes it possible eliminate a risk that the clamp means of that type are lost. Still a further object of the invention is to create a tool where during dismounting there is no need for using different key means.

According to the invention at least the primary object is attained by a tool head which is adapted to receive a cutting insert for chip removal machining. The tool head comprises a basic holder including a lower support part and an upper clamping portion defining therebetween an insert-receiving pocket. A slot extends through the basic holder at a location spaced from the pocket, wherein the clamping portion is joined to a remaining portion of the basic holder by a hinge portion about which the clamping portion is elastically displaceable toward the slot and in communication therewith. A nut roll is positioned within the recess. A clamping screw extends through the slot and into engagement with the nut roll, wherein the clamping screw includes a conical head arranged to enter the slot for expanding the slot and elastically displacing the clamping portion about the hinge portion and toward the support part.

DETAILED DESCRIPTION OF A PREFERRED EMBODIMENT OF THE INVENTION

Figure 1:
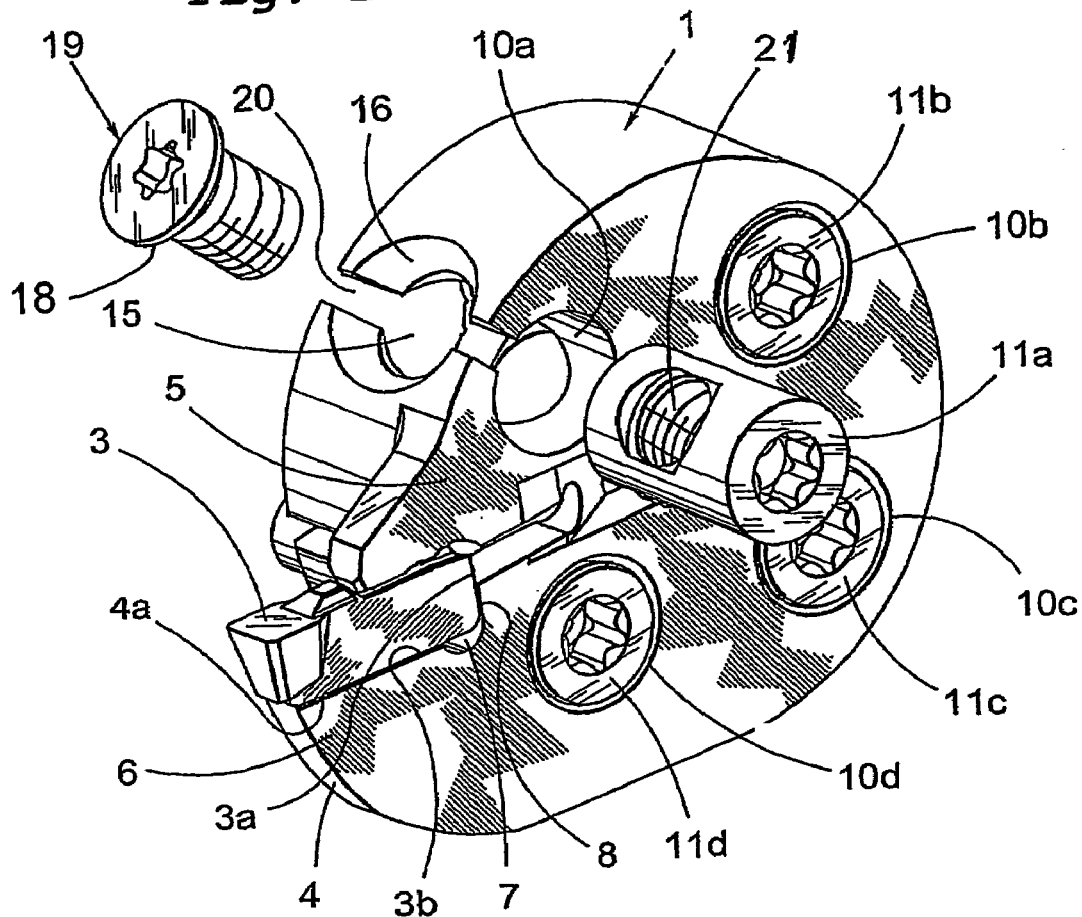
FIG. 1 is perspective exploded view showing a tool according to an embodiment of the invention, including a holder and an adapter in the form of a cutting head, said holder as well as the adapter being schematically illustrated.
Figure 2:
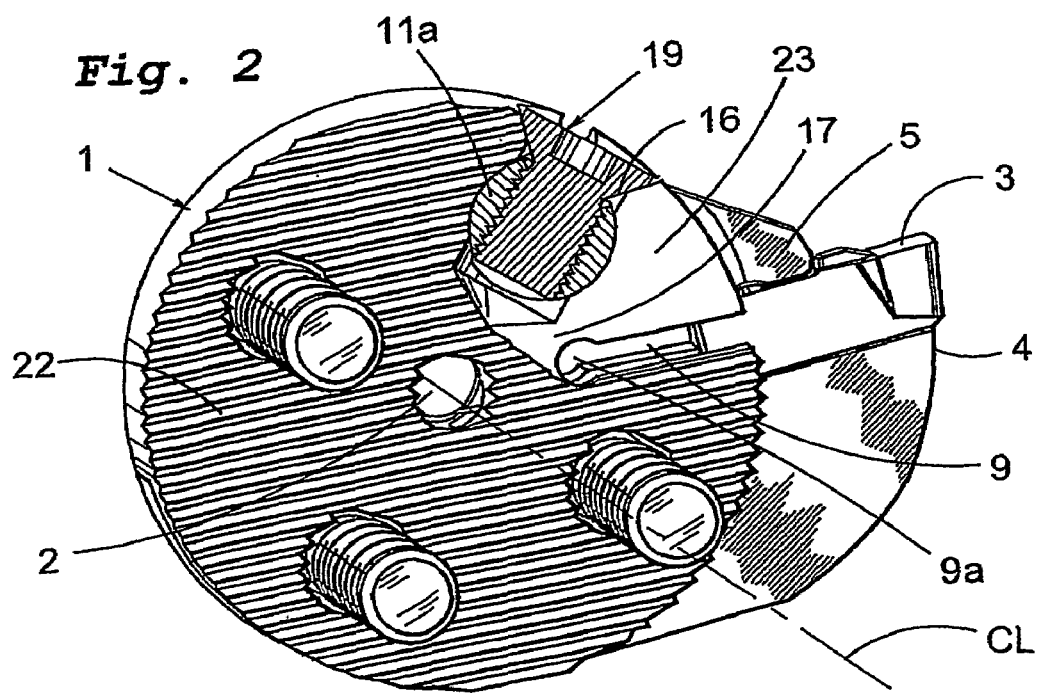
FIG. 2 is a side view of a basic holder and an adapter engaged therewith according to the embodiment in FIG. 1.

In FIG. 1-2 is shown a basic holder 1 comprising a central bore 2 for engagement with a tool machine and 3 designated a cutting insert. The basic holder 1 comprises a forwards and laterally extending portion 4. The basic holder is intended to be engaged to a tool machine, for instance a multipurpose lathe. The portion 4 extending laterally is provided as a blade-shaped portion comprising a lower insert supporting portion 6 and an integral upper clamp portion 5 with smaller width than the remainder of the basic holder 1. Between the upper clamp portion 5 and the lower clamp portion 6 there is provided a clamping slot 7 for the receipt of an insert 3 for chip removing machining. The insert's rear end surface 3a is intended to abut against a shoulder 8 which limits its axial rear displacement. The shoulder 8 extends from the lower support portion 6 of the lateral side portion 4. Due to this, the clamping slot 7 transforms rearwardly into a slot extension 9 with considerably smaller height than the forward slot 7. The end portion of the slot extension 9 is designated 9a. Distinguishing is also that the lower surface 3b of the cutting insert preferably is oriented in a direction perpendicularly towards the rear end surface 3a of the insert and that said lower surface 3b simultaneously is parallel with the intended feed direction. The rear portion of the upper portion of the insert and the lower surface 3b have preferably been provided with concave V-shaped wedge-type recesses in the manner described and shown in Swedish patent application 9703434-2 (corresponding to U.S. Pat. No. 6,086,291) the content of which is incorporated herewith.

The basic holder is provided with a plurality of spaced cylindrical holes 10a, 10b, 10c, 10d which extend laterally in a direction parallel with the central axis CL of the basic holder. In one of these holes 10a there is provided a corresponding nut roll 11 that is located therein with a suitable play whereby the axial length of each nut roll is the same as the thickness of the basic holder 1 and the integral toolholder 4. Further, it is intended to have three clamp screws 11b, 11c, 11d received in the remainder of said holes 10b, 10c, 10d to be threadably engaged in corresponding holes in suitable connecting portion in a corresponding machine (not shown). Adjacent to the hole 10a that is located at a small inclined distance above the clamp portion 5 there is cylindrical recess 15 oriented perpendicularly from said hole 10a, the upper end portion of which has an outwardly facing conical recess 16.

The recess 15 extends radially inwardly to a position between the bore 2 and the end portion 9a on the slot 9 such that a hinge 17 is provided therebetween. This recess is intended to receive a clamp screw 19 with a correspondingly formed conical head 18, the lower portion of which is intended to be threadably engaged in a threaded portion 21 of the nut roll 11a. As best appears from FIG. 1 the tool holder 1 is also provided with a laterally extending slot 20 that extends to the recess 12 which slot extends all the way through said holder whilst extending centrally through said conical recess 16. From FIG. 1 it appears that the insert receiving slot 7 extends laterally through both the basic holder 1 and the toolholder 4. The inner surface of the holder 1 is provided with a serration 22 that extends in the longitudinal direction of the insert except for the surface portion 23 that is located between the screw 19 and the slot extension 9. A corresponding serration is understood to be present on the machine in which the holder 1 is to be connected. Upon insertion of a new cutting insert 3 the insert is subjected to clamping by tightening the partially conical screw 19. Upon axial insertion of the screw head 18 said slot 20 will become widened and the clamp portion 5 will be brought into engagement with the top surface of said insert 3. Upon exchanging insert it will only be necessary to disengage the clamp screw 19 a short distance whereby the width of said slot will resume its width in a non-clamped position such that the insert can be exchanged without having to disengage the screw 19 in its entirety.

The screw receiving recess 15 ought to extend longitudinally in a direction that is provided at an angle of 25-105° relative to the longitudinal direction of the insert pocket. This angle preferably amounts to 35-90° in order to obtain an optimal moment arm in relation to the hinge 17. At the same time the basic holder 1 should preferably have a width that is several times the width of the insert-receiving portion 4 which represents the insert carrying holder portion. With the embodiment shown in FIG. 1-2 the longitudinal extent of the insert 3 should be larger than the underneath support surface 4a of the insert holder 4 as appears from FIG. 2 such that the insert obtains a side support from the basic holder 1.

The invention claimed is:

1. A tool head adapted to receive a cutting insert for chip removal machining, comprising:
   a basic holder including an insert holder formed by a lower support part and an upper clamping portion which define therebetween an insert-receiving pocket;
   a slot extending through the basic holder at a location spaced from the pocket, wherein the clamping portion is joined to a remaining portion of the basic holder by a hinge portion about which the clamping portion is elastically displaceable toward the lower support part;
   a recess extending through the basic holder substantially parallel to the slot and in communication therewith;
   a nut roll positioned within the recess, the nut roll having a radial axis and a longitudinal axis; and
   a clamping screw extending through the slot and into threaded engagement with the nut roll, a longitudinal axis of said clamping screw oriented perpendicularly to a longitudinal axis of said nut roll, wherein the longitudinal axis of the clamping screw extends from a head of the clamping screw to a lower portion of the clamping screw, the clamping screw includes a substantially conical head arranged to enter the slot and engage the upper clamping portion to expand the slot and elastically displace the clamping portion about the hinge portion and toward the support part.

2. The tool head according to claim 1 wherein the clamping screw forms an angle in the range of 35-90 degrees with a longitudinal direction of the insert-receiving pocket.

3. The tool head according to claim 1 wherein the clamping screw passes through a bore formed in the slot, the bore having a conical countersink engaged by the head of the screw.

4. The tool head according to claim 1 wherein the recess and the nut roll are substantially cylindrical.

5. The tool head according to claim 1 wherein the remaining portion of the basic holder has a first thickness in a direction parallel to the slot, and the support part and the clamping portion each have a second thickness parallel to, and less than, the first thickness.

6. The tool head according to claim 1 wherein the insert-receiving pocket transforms into an extension having a shorter height than the insert-receiving pocket.

7. The tool head according to claim 1 wherein said pocket terminates in a support surface extending substantially perpendicular to a longitudinal direction of the pocket.

8. The tool head according to claim 1 wherein the insert receiving pocket extends transversely relative to the recess, the slot, and the hinge portion.

9. The tool head according to claim 1 wherein the recess extends through first and second side surfaces of the basic holder, wherein the second side surface is remote from the insert holder and includes serrations, each serration extending parallel to a direction in which an insert is installed into the insert-receiving pocket.

10. The tool head according to claim 9 wherein a portion of the second side surface disposed on the upper clamping portion is free of serrations.

11. A metal machining tool comprising a tool head and a cutting insert removably mounted therein, the tool head comprising:
   a basic holder including a lower support part and an upper clamping portion defining therebetween an insert-receiving pocket in which the cutting insert is removably mounted, wherein a longitudinal length of the cutting insert is longer than a longitudinal length of the pocket;
   a slot extending through the basic holder at a location spaced from the pocket, wherein the clamping portion is joined to a remaining portion of the basic holder by a hinge portion about which the clamping portion is elastically displaceable toward the cutting insert;
   a recess extending through the basic holder substantially parallel to the slot and in communication therewith;
   a nut roll positioned within the recess, the nut roll having a radial axis and a longitudinal axis; and
   a clamping screw extending through the slot and into threaded engagement with the nut roll, a longitudinal axis of said clamping screw oriented perpendicularly to a longitudinal axis of said nut roll, wherein the longitudinal axis of the clamping screw extends from a head of the clamping screw to a lower portion of the clamping screw, wherein the clamping screw includes a substantially conical head arranged to enter the slot and engage the upper clamping portion to expand the slot and elastically displace the clamping portion about the hinge portion and toward the cutting insert.

12. A tool head adapted to receive a cutting insert for chip removal machining, comprising:
   a basic holder including an insert holder formed by a lower support part and an upper clamping portion which define therebetween an insert-receiving pocket;
   a slot extending through the basic holder at a location spaced from the pocket, wherein the clamping portion is joined to a remaining portion of the basic holder by a hinge portion about which the clamping portion is elastically displaceable toward the lower support part;
   a recess extending through the basic holder substantially parallel to the slot and in communication therewith;
   a nut roll positioned within the recess;
   a clamping screw extending through the slot and into threaded engagement with the nut roll, wherein the clamping screw includes a substantially conical head arranged to enter the slot and engage the upper clamping portion to expand the slot and elastically displace the clamping portion about the hinge portion and toward the support part;

wherein the recess extends through first and second side surfaces of the basic holder, wherein the second side surface is remote from the insert holder and includes serrations, each serration extending parallel to a direction in which an insert is installed into the insert-receiving pocket.

13. The tool head of claim 12, wherein a portion of the second side surface disposed on the upper clamping portion is free of serrations.

* * * * *